US011432118B2

(12) United States Patent
Haran et al.

(10) Patent No.: US 11,432,118 B2
(45) Date of Patent: Aug. 30, 2022

(54) METHOD AND APPARATUS FOR CONTEXT-BASED RELIABLE V2X OPERATION

(71) Applicant: Autotalks Ltd., Kfar Netter (IL)

(72) Inventors: Onn Haran, Bnei Dror (IL); Ron Toledano, Tel Aviv (IL); Yossi Shaul, Givatayim (IL)

(73) Assignee: Autotalks Ltd., Kfar Netter (IL)

( * ) Notice: Subject to any disclaimer, the term of this patent is extended or adjusted under 35 U.S.C. 154(b) by 65 days.

(21) Appl. No.: 16/998,477

(22) Filed: Aug. 20, 2020

(65) Prior Publication Data
US 2021/0120384 A1  Apr. 22, 2021

Related U.S. Application Data

(60) Provisional application No. 62/924,261, filed on Oct. 22, 2019.

(51) Int. Cl.
*H04W 4/40* (2018.01)
*H04L 1/18* (2006.01)
(Continued)

(52) U.S. Cl.
CPC ............ *H04W 4/40* (2018.02); *H04L 1/1812* (2013.01); *H04W 4/06* (2013.01); *H04W 28/0289* (2013.01)

(58) Field of Classification Search
CPC ..... H04W 4/40; H04W 4/06; H04W 28/0289; H04L 1/1812; H04L 2001/0093; H04L 1/188; H04L 1/1896; H04L 1/1685
See application file for complete search history.

(56) References Cited

U.S. PATENT DOCUMENTS 10,623,920 B2    10/2020  Futaki
2016/0091612 A1*  3/2016  Heo ..................... G01S 13/931
                                                      701/468
(Continued)

FOREIGN PATENT DOCUMENTS

WO       2020092831 A1    5/2020

OTHER PUBLICATIONS

Zexian Li et al; "Final 5G V2X Radio Design" Fifth Generation Communication Automotive Research and innovation. (2019).
(Continued)

*Primary Examiner* — Hassan Kizou
*Assistant Examiner* — Abdullahi Ahmed
(74) *Attorney, Agent, or Firm* — Nathan & Associates; Menachem Nathan

(57) ABSTRACT

Apparatus for V2X communications comprising an application layer configured to analyze a high-risk scenario involving a self-vehicle and other vehicles, an access or network layer configured to ensure reception of messages broadcast by the self-vehicle by requesting acknowledged only from vehicles identified as involved in the high-risk scenario, and an interface connecting the application layer to the access or network layer for carrying results of the analysis of the high-risk scenario and the identification of involved vehicles. In an exemplary method of use, a self-vehicle performing identifies vehicles involved in a high-risk scenario, broadcasts one or more times a first message that can prevent or mitigate the high-risk, requests acknowledgement for the first message from only the identified vehicles, and rebroadcasts the first message if acknowledgement is not received from all the identified vehicles before a predetermined condition is fulfilled.

13 Claims, 4 Drawing Sheets

(51) Int. Cl.
*H04W 4/06* (2009.01)
*H04W 28/02* (2009.01)

(56) References Cited

U.S. PATENT DOCUMENTS

| | | | |
|---|---|---|---|
| 2017/0303322 A1* | 10/2017 | Watfa | H04W 28/24 |
| 2018/0234524 A1* | 8/2018 | Cheng | H04W 72/1263 |
| 2018/0270888 A1* | 9/2018 | Faccin | H04W 76/15 |
| 2018/0359778 A1* | 12/2018 | Splitz | H04W 74/085 |
| 2019/0031141 A1* | 1/2019 | Lazarini | B60R 25/209 |
| 2019/0043360 A1* | 2/2019 | Weinfield | G08G 1/164 |
| 2019/0124015 A1* | 4/2019 | Loehr | H04W 72/02 |
| 2019/0182639 A1* | 6/2019 | Basu Mallick | H04W 72/10 |
| 2019/0227555 A1* | 7/2019 | Sun | G05D 1/0212 |
| 2020/0178048 A1* | 6/2020 | Kim | H04W 4/40 |
| 2021/0065551 A1* | 3/2021 | Manohar | G08G 1/161 |
| 2021/0084542 A1* | 3/2021 | Ahmad | H04W 28/24 |

OTHER PUBLICATIONS

Ganesan et al; "5G V2X Architecture and Radio Aspects" ResearchGate. (2019).
Ganesan et al; "NR Sidelink Design Overview for Advanced V2X Service" IEEE Internet of Things Magazine vol. 1 Issue 3. (2020).
Dillinger "Connected and Automated Mobility by 5G". (2019).

* cited by examiner

METHOD AND APPARATUS FOR CONTEXT-BASED RELIABLE V2X OPERATION

CROSS-REFERENCE TO RELATED APPLICATIONS

This application is related to and claims priority from U.S. Provisional Patent Application No. 62/924,261 filed Oct. 22, 2019, which is expressly incorporated herein by reference in its entirety.

FIELD

Embodiments disclosed herein relate in general to operation of vehicle-to-everything (V2X) communication systems and methods, and in particular to providing reliable communications during safety-related driving scenarios (also referred to herein simply as "scenarios" or "use-cases").

BACKGROUND

The essence of V2X communications (referred to henceforth for simplicity as just "V2X") is transmission of broadcast packets. Such broadcast packets are unacknowledged by nature.

Packets can get lost, either due to a challenging wireless link, collision with transmissions of other vehicles, or hardware failures.

V2X wireless standards, either IEEE802.11p or 3 GPP C-V2X Rel. 14/15/16, do not assure data reception. Radio performance is defined for 10% packet error rate (PER), meaning a 90% packet acceptance rate. Safety requires nearly 100% packet acceptance rate, which can be achieved only with retransmissions until reception is acknowledged. In wireless standards, retransmission is not defined for Broadcast and Multicast. Absolute reliability would require feedback from all vehicles that should have received the broadcast message. This would significantly load the channel in use, causing the adverse effect of degrading the communication reliability due to a higher probability of collisions.

A wireless network cannot be fully trusted without acknowledgment, yet V2X life-saving ability depends on the ability to deliver messages. A vehicle in a life-threatening (or more generally in a high-risk) scenario may avoid or mitigate an upcoming accident if a V2X message is received in a timely manner. The problem is assuring that critical V2X messages are received in high-risk scenario.

When many vehicles in a small area use the wireless link, a congestion control algorithm kicks in to improve reception probability. One of the commonly used congestion control schemes is to increase the period between consecutive transmissions. For example, according to USA SAE profiles, a device can transmit every 300 mS instead of every 100 mS. A single lost packet will imply reception after 600 mS. However, this only increases the problem since there are fewer opportunities for correct packet reception, and latency between correctly received packets increases.

It is desired to add efficient mechanisms to enhance the reliability of the operation of V2X systems and methods in high-risk scenarios, and combine such mechanisms with congestion control algorithms.

SUMMARY

In exemplary embodiments, there is provided a method, comprising: by a self-vehicle performing V2X communications: identifying vehicles involved in a high-risk scenario to obtain identified vehicles; broadcasting one or more times a first message that can prevent or mitigate the high-risk; requesting acknowledgement for the first message from only the identified vehicles; and rebroadcasting the first message if acknowledgement is not received from all the identified vehicles before a predetermined condition is fulfilled. The condition may be expiration of a time period or expiration of a number of rebroadcasts.

In some embodiments, the identifying of the vehicles involved in a high-risk scenario is preceded by detecting the high-risk scenario.

In some embodiments, the identifying the vehicles involved in a high-risk scenario is preceded by detecting the high-risk scenario.

In some embodiments, the high-risk scenario involves the self-vehicle and other vehicles impacted by objects detected by the self-vehicle if object sharing is applied.

In some embodiments, the method further comprises instructing a congestion control algorithm to prevent a decrease in transmission frequency of the self-vehicle if the first message prevents or mitigates the high-risk.

In some embodiments, the method further comprises stopping the rebroadcasting of the first message if the predetermined time period expires.

In some embodiments, the method further comprises comprising stopping the rebroadcasting of the first message if the predetermined number of broadcasts expires.

In some embodiments, the method further comprises determining that the high-risk has ended and resuming normal V2X operation.

In exemplary embodiments, there is provided apparatus for V2X communications, comprising: an application layer configured to analyze a high-risk scenario involving a self-vehicle and other vehicles; an access or network layer configured to ensure reception of messages broadcast by the self-vehicle by requesting acknowledgement only from vehicles identified as involved in the high-risk scenario; and an interface connecting the application layer to the access or network layer for carrying results of the analysis of the high-risk scenario and the identification of involved vehicles.

In some embodiments, the other vehicles are vehicles impacted by objects detected by the self-vehicle if object sharing is applied.

In some embodiments, the application layer includes a detector for detecting the high-risk scenario.

In some embodiments, the application layer includes an identifier for identifying the vehicles involved in the high-risk scenario.

In some embodiments, the access or network layer includes a controller operative to instruct a congestion control algorithm to perform an action in response to detection of the high-risk scenario.

In some embodiments, the action includes an instruction to prevent a decrease in a frequency of the broadcast by the self-vehicle.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way.

DETAILED DESCRIPTION

In various embodiments, there are disclosed apparatus and methods for reliable V2X operation in the presence of a safety risk. These may also be referred to as apparatus and methods for "context-based reliability", where the term "context" relates to risk, i.e. to the fact that acknowledgements are requested only in cases of safety risks and only from vehicles involved in the safety situation, meaning only in the context of risk.

In other words, "context-based reliability" refers to ensuring transmission when identifying high-risk scenarios, by requesting acknowledgement from the vehicles involved in the high-risk scenario. Exemplary high-risk scenarios are listed in Table 1 below.

The apparatus and methods are implemented in self-vehicles. In an exemplary method of V2X communication implementing context-based reliability, acknowledgement ("Ack") is requested by the self-vehicle only for V2X packets that can prevent an identified risk to human lives, of injury, or of property damage (referred to herein generally as "high-risk"), and only from vehicles that are involved in that identified risk ("vehicles at risk"). A vehicle can cause such risk, be affected by such risk, or both. Driving scenarios that impose risk on human lives or property are referred to as high-risk driving scenarios.

Most of the time, a vehicle is not at risk. Therefore, most of V2X packets transmitted by that vehicle do not impact vehicle control. That changes when the vehicle is at risk. Even then, only some vehicles need to acknowledge correct message reception, because most of the other vehicles do not pose a risk (relevant to the high-risk scenario). The context-based reliable V2X operation disclosed herein reduces dramatically the number of acknowledged messages, and reduces even more the number of vehicles having to respond to acknowledgements.

The suggested context-based reliability V2X operation comprises reliability-enhancement mechanisms that can be incorporated in any layer of V2X communications standards. For example, the new versions of access layers, 802.11bd or C-V2X Rel. 17 can be enhanced to include this concept. Similarly, network layers, as defined by ETSI ITS or IEEE1609, can be enhanced to include this concept.

As stated above, congestion control algorithms commonly decrease the frequency of transmissions. By applying the reliability mechanism disclosed herein on a congestion control algorithm, the transmission rate (frequency) of a self-vehicle can be maintained at 100 mS while a dangerous scenario is sustained or until messages are acknowledged, even at high network load.

Figure 1:
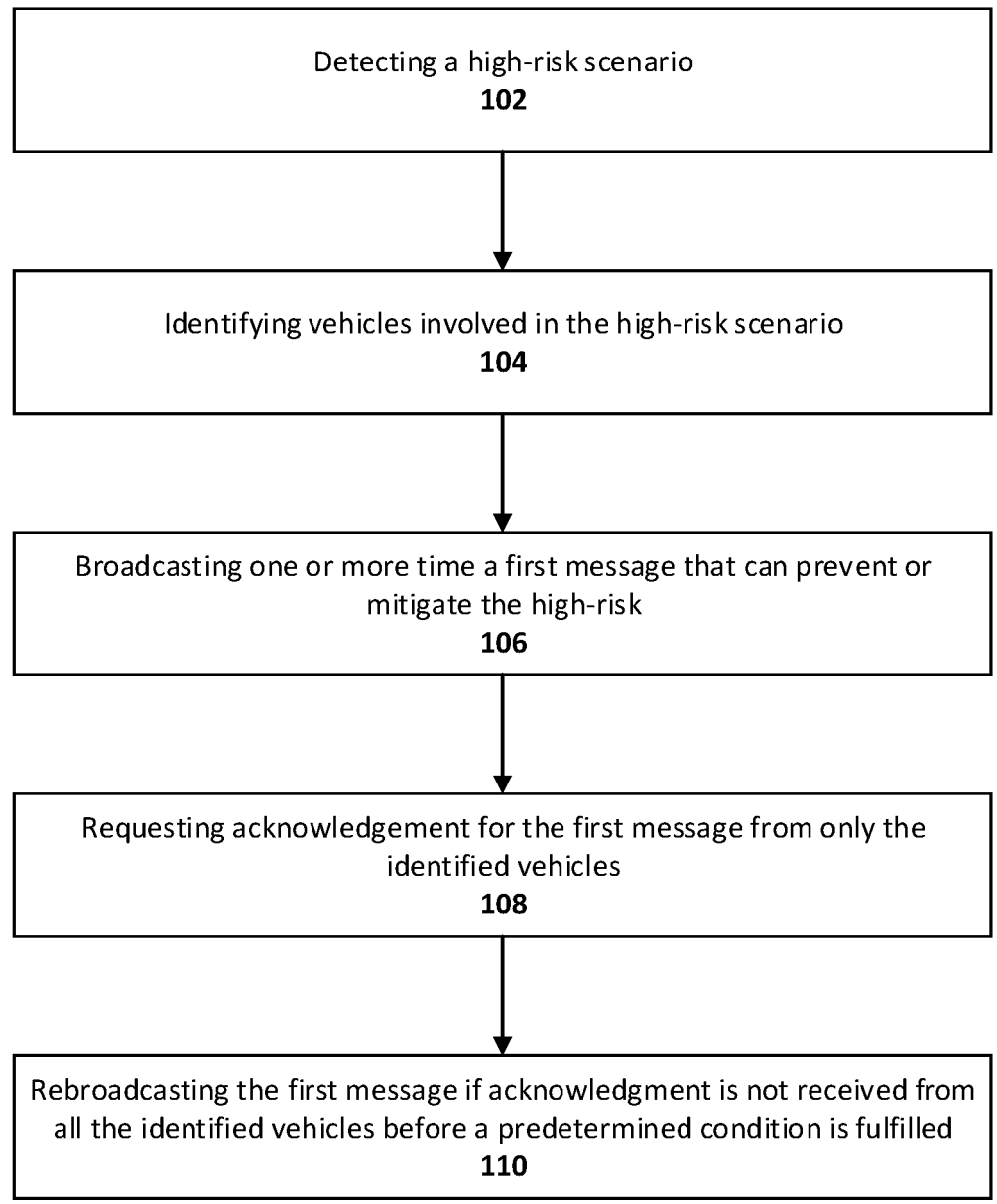
FIG. 1 illustrates in a flow chart an embodiment of context-based reliable V2X operation disclosed herein.

FIG. 1 illustrates in a flow chart an embodiment of context-based reliable V2X operation (method) disclosed herein. The operation (method) is performed in a self-vehicle. The operation begins with step 102 once a safety application detects a high-risk driving scenario that requires high reliability message transmission. As used herein, the term "high-reliability" means reception assurance, i.e. knowing that a transmission was received, by those for whom it is important to receive it. High-reliability V2X operation can mitigate accidents. Therefore, such high-reliability message transmission has to be assured.

The driving scenario detected in step 102 involves vehicles that require high-reliability V2X operation. Such vehicles are identified in step 104. In step 106, a first message that can prevent or mitigate the high-risk is broadcast, one or more times. In step 108, acknowledgment for the first message is requested from only the vehicles identified in step 104. Various formats can be used for the acknowledgment request message or section inside the first message requesting acknowledgment. In step 110, the first message is rebroadcast if acknowledgement is not received from all the identified vehicles before a predetermined condition is fulfilled. The condition may include expiration (or fulfillment) of a number of rebroadcasts or a time period. The number of rebroadcasts may be between 1 and N, where N>1. The time period may for example be a number of milliseconds. The congestion control algorithm is provided with a decision to maintain a 100 mS transmission cycle as long as some vehicles have not acknowledged, or as long as the dangerous scenario lasts. That is, the congestion control algorithm is instructed by the self-vehicle to prevent a decrease in transmission frequency of the self-vehicle.

Table 1 lists exemplary (and by no means limiting) use-cases (scenarios) that impose a high-risk that can be prevented by self-vehicle transmission. The risk can be to vehicles, pedestrians, property, etc. Table 1 also lists identification conditions, which are triggers for declaring a high-risk scenario i.e., the parameters of self and other vehicles that indicate a specific risk to vehicles, pedestrians, property, etc. The content of the table may evolve once more use-cases will be supported by V2X, and can be refined based on further study.

TABLE 1

| List of use-cases and selected vehicles | | |
| --- | --- | --- |
| High-risk Scenario | Identification Condition | Guidelines for identifying acknowledging vehicle(s) |
| Self-vehicle is hard braking | Vehicle deceleration is higher than a threshold | All vehicles in same-lane within 50 meters behind self-vehicle (for alerting them for expected immediate stop), and the furthest vehicle behind within communication range |
| Driving event messages | Driving event messages triggering conditions | All vehicles in same-lane within 50 meters behind self-vehicle, and the furthest vehicle behind within communication range |

TABLE 1-continued

List of use-cases and selected vehicles

| High-risk Scenario | Identification Condition | Guidelines for identifying acknowledging vehicle(s) |
|---|---|---|
| Vehicle dynamics change while platooning | Vehicle is a member of a platoon | All other platoon members behind self-vehicle |
| Self-vehicle is entering an intersection | Within 3 seconds distance (i.e. the that self-vehicle drives in 3 seconds) from entering intersection | The first vehicles of all incoming roads to intersection, if moving |
| Self-vehicle is planning to change a lane | Turn light is on | 3 vehicles in target lane (the lane self-vehicle plans to change to) behind the self-vehicle, if within 100 meters |
| Vehicle sensor (e.g. camera) detects a vulnerable road user (e.g. a child) | Vulnerable road user is in the path of other vehicles | All vehicles in the path of the road user within a distance that they drive in 4 seconds |
| Self-vehicle is planning a dangerous pass | Driving in two-lane road; Turn light is on | The closest 2 vehicles ahead in opposite direction |
| Self-vehicle is on collision course with another vehicle | Any arbitrary scenario, not mentioned above | The other vehicle in collision course |
| Self-test | Timer triggers | Arbitrary neighbor |

In all the scenarios listed in Table 1, except self-test, congestion control needs to be disabled while the scenario lasts. This is achieved by setting parameters "disable congestion control at risk" and "disable congestion control if unacknowledged" as true. These parameters may be supplied by detector 212 (see below), after the safety-risk scenario is identified.

Figure 2:
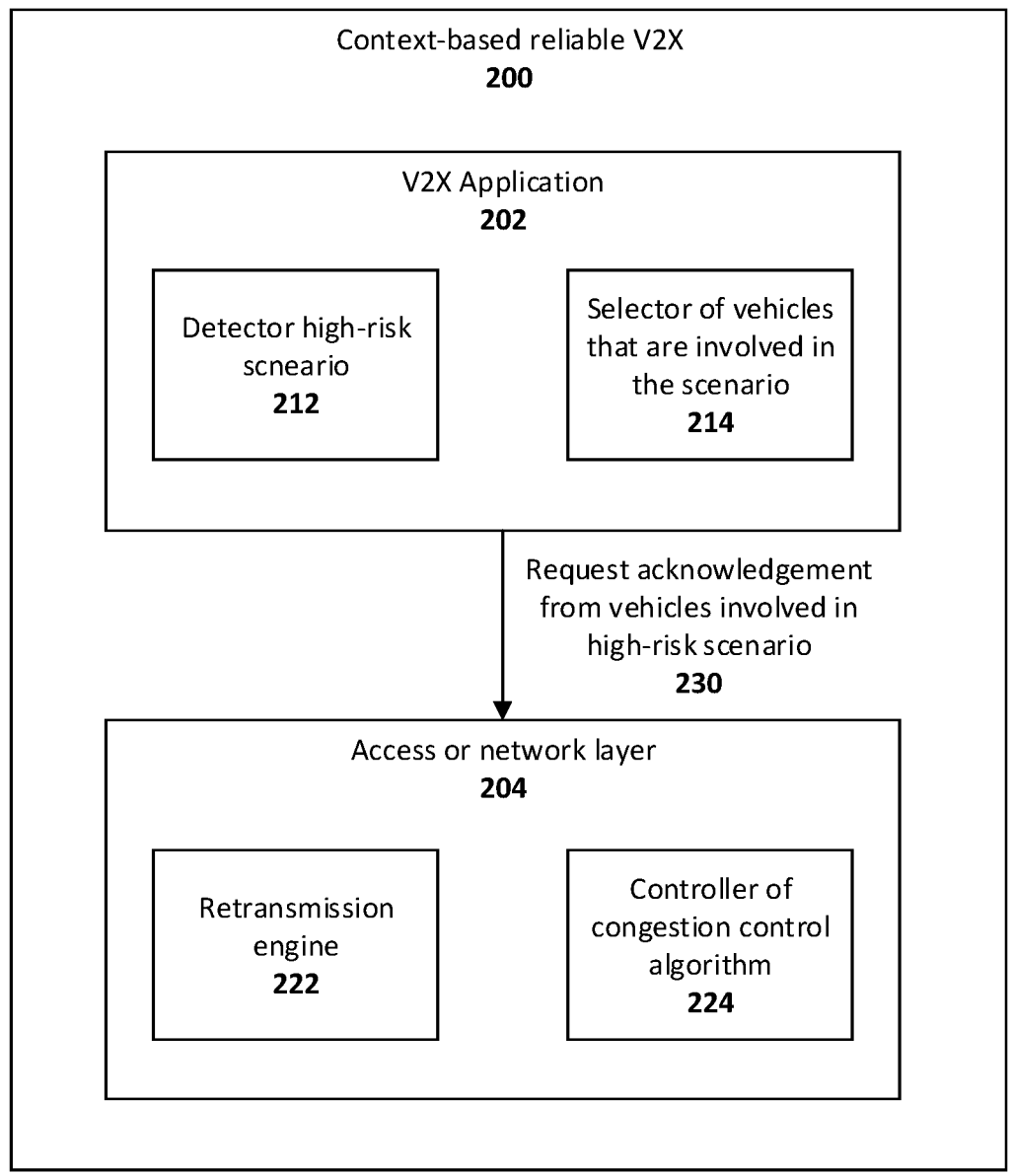
FIG. 2 illustrates block diagram of context-based reliable broadcast.

FIG. 2 illustrates in a block diagram an embodiment numbered 200 of an apparatus for performing context-based reliable V2X operation disclosed herein. Apparatus 200 can be incorporated in a V2X communication system installed in vehicles, and comprises a V2X application layer 202 configured to analyze the safety situation of the self-vehicle and other vehicles. In some embodiments, the other vehicles are all other vehicles impacted by objects detected by the self-vehicle, if object sharing is applied (enabled). "Object sharing" will be enabled by the fact that in the future, V2X equipped vehicles will broadcast all the objects detected by their sensors (like cameras and radar), in addition to the information about vehicle movement. Apparatus 200 further comprises an access or network layer (also referred to as "reliability layer") 204 configured to ensure the reception of broadcast messages from the self-vehicle. For example, reliability layer 204 can extend either 802.11bd, C-V2X Rel. 17, ETSI ITS or IEEE1609. An interface 230 from the application layer to the access or network layer carries identification of the high-risk scenario and the list of identified vehicles.

V2X application layer 202 includes a detector 212 of high-risk scenarios that runs step 102. Detector 212 may be implemented in software (SW). Detector 212 analyzes the self-vehicle with respect to all other vehicles surrounding it to detect a potentially high-risk scenario. V2X application layer 202 further includes an identifier 214 for identifying vehicles involved in the scenario that runs step 104. Identifier 214 may be implemented in SW. A list of vehicles directly involved in the high-risk scenario is identified by identifier 214 based on guidelines that exist per risk scenario. The guidelines are listed as well in Table 1.

Layer 204 includes a retransmission engine 222 (which may be implemented in SW, hardware (HW) or as a combination of SW and HW) that performs step 106, i.e. broadcasting the messages until acknowledged. Layer 204 further includes a controller 224 (which may be implemented in SW) operative to instruct a congestion control algorithm to perform an action in response to the detection of the high-risk scenario. The action is provided in more detail below.

Figure 3:
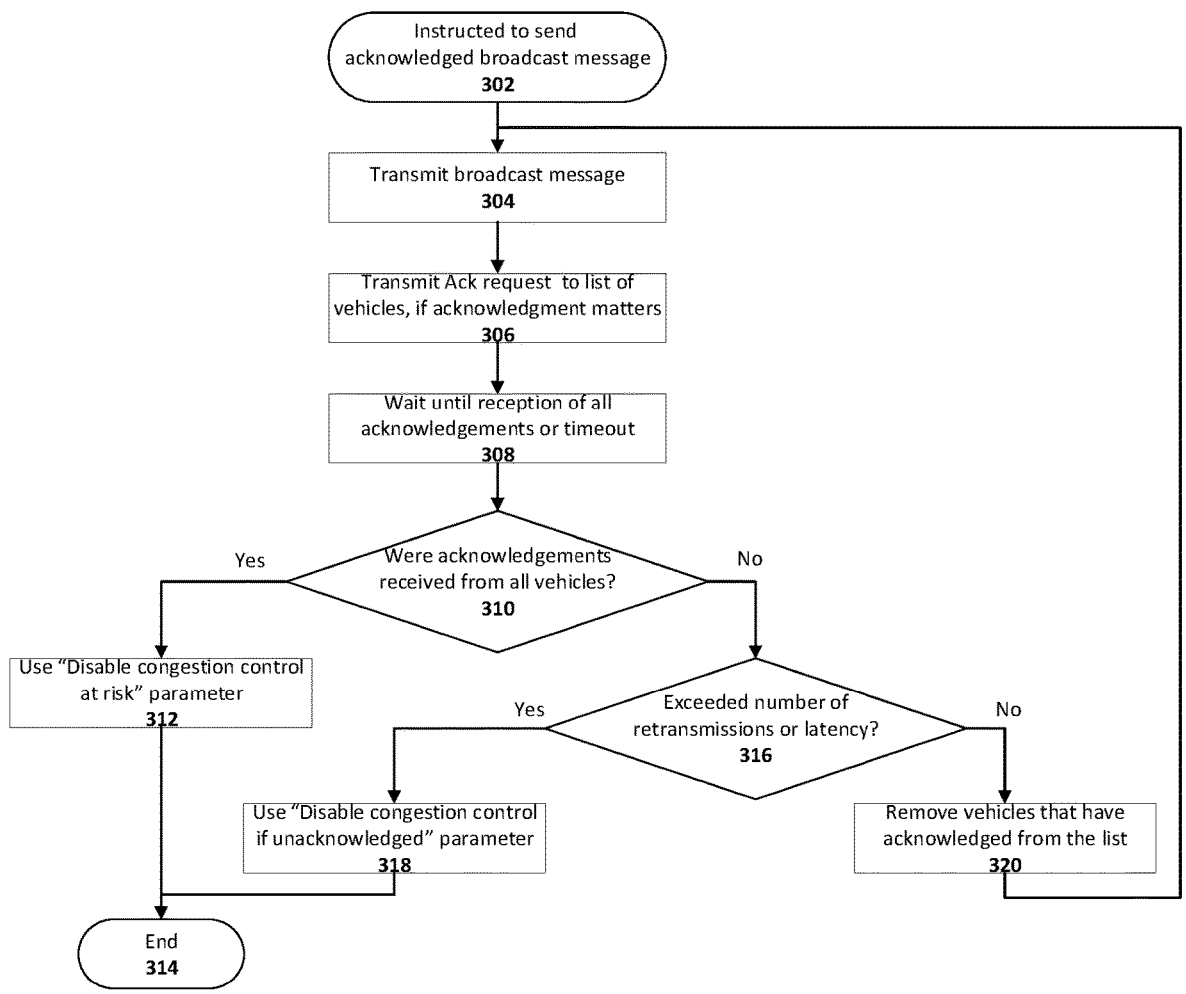
FIG. 3 illustrates flow chart of reliable broadcast transmission state-machine.
Figure 5:
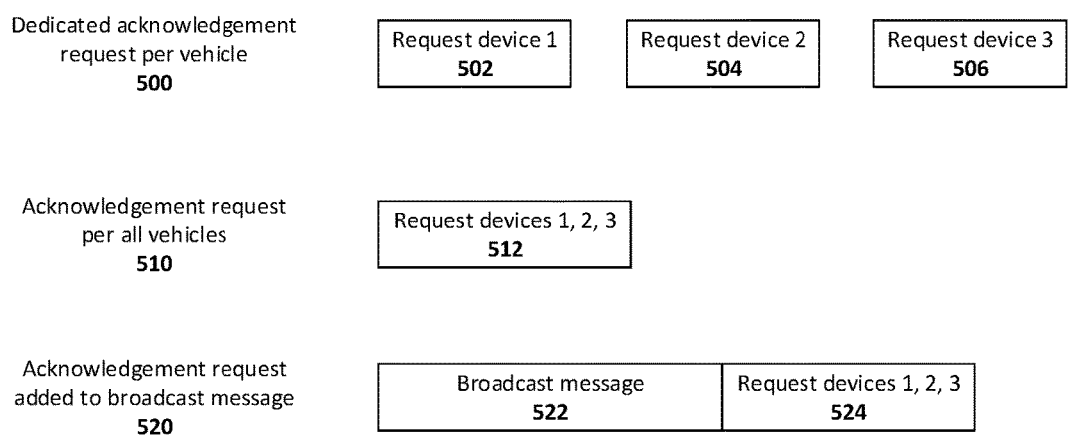
FIG. 5 illustrates an example of acknowledgment request formats.

Steps 106, 108 and 110 are described in more detail in FIG. 3. The operations are performed in retransmission engine 222 and controller 224 in a self-vehicle. Operation begins at step 302, when, upon detection of the high-risk scenario, application layer 202 instructs access or network layer 204 to broadcast a first message i.e. a message that needs to be acknowledged. The safety application provides a list of vehicles that need to confirm its reception, i.e. identification of the vehicles involved in the high-risk scenario. Operation continues from step 304, in which the first message is broadcast. This is followed by (if further retransmissions are allowed) transmitting an Ack request to the vehicles identified by the safety application in step 306. If the number of retransmissions exceeds a predetermined threshold, no further retransmission will take place, since there is no sense in wasting link capacity just for requesting an acknowledgement that will be ignored. The threshold can be time-based or number-based. A time-based threshold may require a counter-response within a certain time. A counter-based threshold may involve a limit for the number of retransmissions. Examples of Ack request formats are shown in FIG. 5.

In step 308, the self-vehicle waits until all vehicles in the list returned acknowledgments or if a predetermined (for example, 20 msec) timeout has expired. A check if performed in step 310 if acknowledgements were received from all vehicles in list. If Yes, then the reliable first message broadcast in step 304 was successfully received, and operation continues to step 312, where the congestion control algorithm is adjusted instructed to prevent a decrease in transmission frequency of the self-vehicle based on a "disable congestion control at risk" parameter. The parameter is "true" or "false", and that value (either true or false) is fed into the congestion control algorithm to inform if it can skip transmission cycles when the network is loaded. Next, the operation ends at step 314. The effect of step 312 is that the transmission frequency of the self-vehicle is not decreases.

If the result of check step 310 results in No, operation continues from step 316 where another check checks if the number of retransmissions or overall latency since the first transmission were exceeded. If Yes, then no more retransmissions can take place, although one or more vehicles have failed to acknowledge. If Yes, the operation continues from step 318, where the congestion control algorithm is instructed to prevent a decrease in transmission frequency of the self-vehicle based on a "disable congestion control if unacknowledged" parameter. From there, the operation moves toward end step 314. If the result of check step 316 is No, operation continues to step 320, where the vehicles that have acknowledged reception are removed from the list of vehicles that need to be acknowledged. It would be unnecessary for those vehicles to acknowledge reception in the upcoming retransmission event, which is performed by returning to step 304.

Figure 4A:
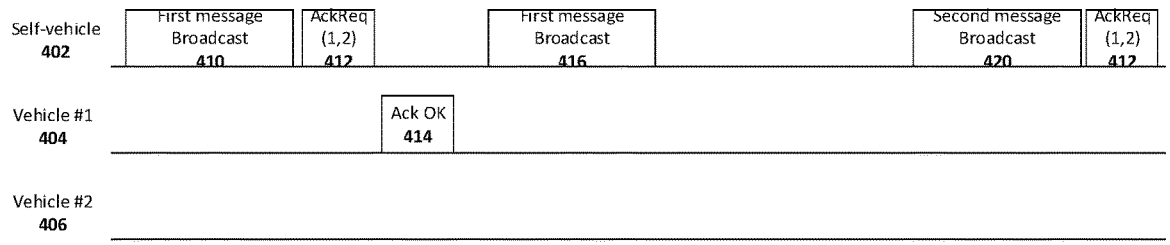
FIG. 4A illustrates an example of retransmission sequence.

A first example for a reliable communication sequence is depicted in FIG. 4A. In this example, congestion control does not operate, and only a single retransmission is allowed per cycle. The example involves an originator (self-vehicle) 402, and two vehicles 404 and 406 expected to acknowledge. More acknowledging vehicles may exist in other scenarios or examples. The originator broadcasts a message 410, which is followed by an Ack request 412 sent to vehicles 404 and 406. Vehicle 404 acknowledges the reception with an Ack OK 414, while vehicle 406 does not acknowledge. The lack of response from vehicle 406 triggers a retransmission (rebroadcast) 416 sent by the originator shortly after, within the same 100 mS cycle. Since in the first example only a single retransmission is allowed, there is no reason to request acknowledgement for the retransmission. A next message 420 is broadcast in the next cycle. Since this is a new cycle, both vehicles 404 and 406 need to acknowledge next broadcast message 420, as requested in 422.

Figure 4B:
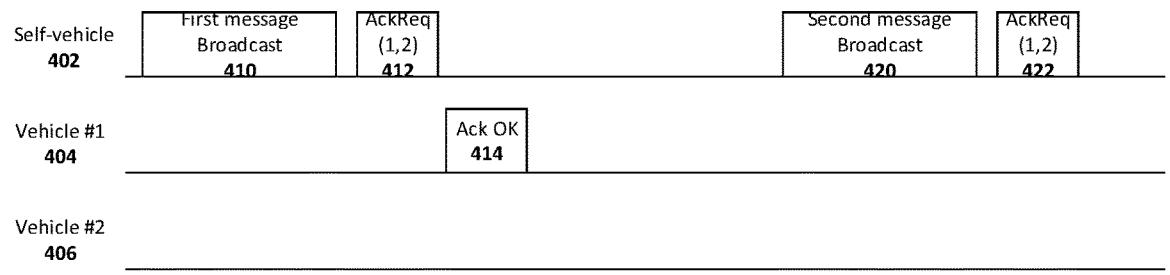
FIG. 4B illustrates an example of retransmission sequence in presence of congestion control.

A second example is depicted in FIG. 4B. The difference from the previous example is the operation of the congestion control algorithm, which now limits the broadcast of messages to every few cycles. Until message 414, the operation is identical to that in the first example. Afterwards, there is no further retransmission in the same cycle, and next transmission 420 takes place in next cycle. Both vehicles 404 and 406 are requested to acknowledge by message 422.

FIG. 5 illustrates an example of acknowledgment request formats. Different options can be used to request acknowledgement. A first option 500 is a specific acknowledgement request message for each of three vehicles 502, 504 and 506. A second option 510 is a single acknowledgement request message sent to multiple vehicles 512. A third option 520 is a section 524 added to a broadcast message 522. A fourth option is using some sort of control channel message, as used in 3GPP, for defining the vehicles that need to acknowledge.

The various features and steps discussed above, as well as other known equivalents for each such feature or step, can be mixed and matched by one of ordinary skill in this art to perform methods in accordance with principles described herein. Although the disclosure has been provided in the context of certain embodiments and examples, it will be understood by those skilled in the art that the disclosure extends beyond the specifically described embodiments to other alternative embodiments and/or uses and obvious modifications and equivalents thereof. Accordingly, the disclosure is not intended to be limited by the specific disclosures of embodiments herein.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

It is appreciated that certain features of the invention, which are, for clarity, described in the context of separate embodiments or example, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Citation or identification of any reference in this application shall not be construed as an admission that such reference is available as prior art to the present application.

What is claimed is:

1. A method, comprising: by a self-vehicle performing vehicle-to-everything (V2X) communications:
   using V2X communications to identify vehicles involved in a high-risk scenario to obtain identified vehicles;
   broadcasting one or more times a first V2X message that can prevent or mitigate the high-risk;
   requesting acknowledgement for the first V2X message from only the identified vehicles;
   rebroadcasting the first V2X message if acknowledgement is not received from all the identified vehicles before a predetermined condition is fulfilled; and
   instructing a congestion control algorithm to prevent a decrease in transmission frequency of the self-vehicle if the first message prevents or mitigates the high-risk.

2. The method of claim 1, wherein the condition is expiration of a time period.

3. The method of claim 1, wherein the condition is expiration of a number of rebroadcasts.

4. The method of claim 1, wherein the high-risk scenario involves the self-vehicle and other vehicles impacted by objects detected by the self-vehicle if object sharing is applied.

5. The method of claim 1, wherein the identifying the vehicles involved in a high-risk scenario is preceded by detecting the high-risk scenario.

6. The method of claim 1, further comprising determining that the high-risk scenario has ended and resuming normal V2X operation.

7. The method of claim 2, further comprising stopping the rebroadcasting of the first message if the time period expires.

8. The method of claim 3, further comprising stopping the rebroadcasting of the first message if the number of broadcasts expires.

9. Apparatus for vehicle-to-everything (V2X) communications, comprising:
   an application layer configured to analyze a high-risk scenario involving a self-vehicle and other vehicles;
   an access or network layer configured to ensure reception of V2X messages broadcast by the self-vehicle by requesting acknowledgement only from vehicles identified by V2X communications as involved in the high-risk scenario; and an interface connecting the application layer to the access or network layer for carrying results of the analysis of the high-risk scenario and the identification of involved vehicles, wherein the access or network layer includes a controller operative to instruct a congestion control algorithm to perform an action in response to detection of the high-risk scenario.

10. The apparatus of claim 9, wherein the other vehicles are vehicles impacted by objects detected by the self-vehicle if object sharing is applied.

11. The apparatus of claim 9, wherein the application layer includes a detector for detecting the high-risk scenario.

12. The apparatus of claim 9, wherein the application layer includes an identifier for identifying the vehicles involved in the high-risk scenario.

13. The apparatus of claim 9, wherein the action includes an instruction to prevent a decrease in a frequency of the broadcast by the self-vehicle.

* * * * *